(12) United States Patent
Koskela et al.

(10) Patent No.: US 11,096,169 B2
(45) Date of Patent: Aug. 17, 2021

(54) USE OF MAPPING OPTIONS FOR LOGICAL CHANNELS AND TRANSPORT CHANNELS FOR WIRELESS NETWORKS

(71) Applicant: NOKIA SOLUTIONS AND NETWORKS OY, Espoo (FI)

(72) Inventors: Timo Koskela, Oulu (FI); Vinh Van Phan, Oulu (FI); Samuli Heikki Turtinen, Ii (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/769,600

(22) PCT Filed: Nov. 18, 2015

(86) PCT No.: PCT/EP2015/077002
§ 371 (c)(1),
(2) Date: Apr. 20, 2018

(87) PCT Pub. No.: WO2017/084706
PCT Pub. Date: May 26, 2017

(65) Prior Publication Data
US 2018/0310309 A1 Oct. 25, 2018

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0053* (2013.01); *H04L 5/0094* (2013.01);
(Continued)

(58) Field of Classification Search
None
See application file for complete search history.

(56) References Cited

U.S. PATENT DOCUMENTS

2008/0056229 A1\* 3/2008 Gholmieh ........... H04W 72/042
370/349
2010/0272004 A1\* 10/2010 Maeda ................. H04L 5/0007
370/312
(Continued)

FOREIGN PATENT DOCUMENTS

| EP | 2343945 A2 | 7/2011 |
| EP | 2530993 A1 | 12/2012 |
| EP | 2757855 A1 | 7/2014 |

OTHER PUBLICATIONS

"NOKIA Vision & Priorities for Next Generation Radio Technology", 3GPP RAN Workshop on 5G, RWS-150010, Phoenix, AZ, USA, Sep. 17-18, 2015 (17 pages).
(Continued)

*Primary Examiner* — Noel R Beharry
*Assistant Examiner* — Rodrick Mak
(74) *Attorney, Agent, or Firm* — Brake Hughes Bellermann LLP

(57) ABSTRACT

There is provided a method comprising receiving, at a user device, control information usable for determining whether at least one uplink logical channel is to be transmitted using at least one of a first uplink transport channel and a second uplink transport channel, determining, in dependence on said information, a mapping between the at least one uplink logical channel and at least one of the first uplink transport channel and second uplink transport channel and causing the at least one uplink logical channel to be transmitted using the at least one uplink transport channel to which the at least one uplink logical channel is mapped.

26 Claims, 7 Drawing Sheets

(51) Int. Cl.
*H04W 28/02* (2009.01)
*H04L 12/835* (2013.01)
*H04W 76/28* (2018.01)
*H04L 1/18* (2006.01)

(52) U.S. Cl.
CPC ......... *H04L 47/30* (2013.01); *H04W 28/0263* (2013.01); *H04W 28/0278* (2013.01); *H04W 72/042* (2013.01); *H04L 1/1893* (2013.01); *H04W 76/28* (2018.02)

(56) References Cited

U.S. PATENT DOCUMENTS

| | | | | |
|---|---|---|---|---|
| 2011/0280223 A1* | 11/2011 | Maeda | ................... | H04W 4/08 370/335 |
| 2011/0310986 A1* | 12/2011 | Heo | ....................... | H04L 5/001 375/259 |
| 2011/0317577 A1* | 12/2011 | Yamada | ............ | H04W 72/0453 370/252 |
| 2012/0069815 A1* | 3/2012 | Aiba | ..................... | H04L 1/1664 370/329 |
| 2012/0275381 A1 | 11/2012 | Kim et al. | | |
| 2012/0294269 A1* | 11/2012 | Yamada | ................ | H04W 74/02 370/329 |
| 2017/0078058 A1* | 3/2017 | Marinier | ............... | H04W 72/02 |
| 2018/0124824 A1* | 5/2018 | Lee | ....................... | H04W 48/16 |
| 2018/0160372 A1* | 6/2018 | Benjebbour | ........ | H04W 52/241 |

OTHER PUBLICATIONS

3GPP TS36.321 V12.6.0 (Jun. 2015); 3rd Generation Partnership Project; Technical Specification Group Radio Access Network; Evolved Universal Terrestrial Radio Access (E-UTRA); Medium Access Control (MAC) protocol specification (Release 12)—Relevant Section 4.5.3; Jun. 2015; 77 pages.

3GPP TSG-RAN WG2 #85bis; R2-141550; "Introduction of dual connectivity in MAC"; Mar. 21, 2014; XP050817625; 45 pages.

International Search Report and Written Opinion for International Application No. PCT/EP2015/077002, dated Aug. 3, 2016 (14 pages).

Office Action for European Application No. 15801367.2, dated Feb. 18, 2020, 9 pages.

Office Action for European Application No. 15801367.2, dated Nov. 19, 2020, 9 pages.

* cited by examiner

Figure 4

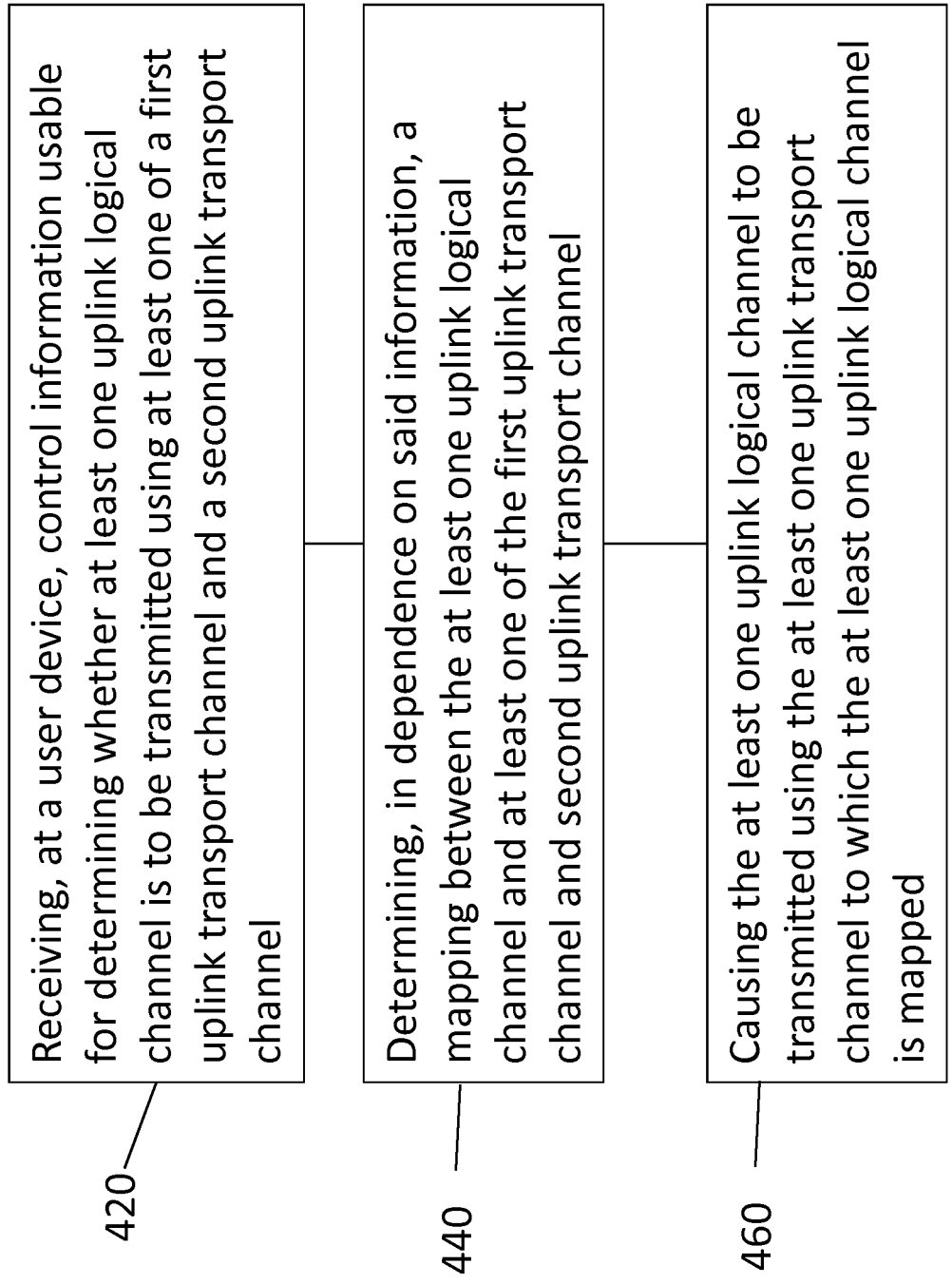

420 — Receiving, at a user device, control information usable for determining whether at least one uplink logical channel is to be transmitted using at least one of a first uplink transport channel and a second uplink transport channel 440 — Determining, in dependence on said information, a mapping between the at least one uplink logical channel and at least one of the first uplink transport channel and second uplink transport channel 460 — Causing the at least one uplink logical channel to be transmitted using the at least one uplink transport channel to which the at least one uplink logical channel is mapped

USE OF MAPPING OPTIONS FOR LOGICAL CHANNELS AND TRANSPORT CHANNELS FOR WIRELESS NETWORKS

CROSS-REFERENCE TO RELATED APPLICATIONS

This application is a national stage entry of PCT Application No. PCT/EP2015/077002 filed Nov. 18, 2015, entitled "METHOD, SYSTEM AND APPARATUS" which is hereby incorporated by reference in its entirety.

FIELD

The present application relates to a method, apparatus, system and computer program and in particular but not exclusively to facilitating and controlling mapping of transport channels.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. Certain releases of 3GPP LTE (e.g., LTE Rel-11, LTE Rel-12, LTE Rel-13) are targeted towards LTE-Advanced (LTE-A). LTE-A is directed towards extending and optimising the 3GPP LTE radio access technologies. One type of communication system is a 5G communication system.

SUMMARY

In a first aspect there is provided a method, said method comprising receiving, at a user device, control information usable for determining whether at least one uplink logical channel is to be transmitted using at least one of a first uplink transport channel and a second uplink transport channel, determining, in dependence on said information, a mapping between the at least one uplink logical channel and at least one of the first uplink transport channel and second uplink transport channel and causing the at least one uplink logical channel to be transmitted using the at least one uplink transport channel to which the at least one uplink logical channel is mapped.

The at least one uplink logical channel may comprise at least one of a dedicated traffic channel, a dedicated control channel, a common control channel, a common traffic channel and a channel carrying media access control messages.

The first uplink transport channel may comprise an uplink contention based channel. The second uplink transport channel may comprise an uplink shared channel.

The determined mapping may be valid for a first time period.

The control information may comprise an indication to map the at least one uplink logical channel with at least one of the first uplink transport channel and the second uplink transport channel. The indication may be determined in dependence on which of at least one trigger is present.

The method may comprise determining whether at least one trigger is present and determining the mapping in dependence on which of at least one trigger is present.

The method may comprise providing a request to a network node to use the determined mapping.

The at least one trigger may be dependent on at least one of an uplink buffer load threshold, an uplink channel load threshold, an uplink logical channel latency threshold and a type of service requiring uplink access.

The method may comprise receiving, from a network node, an indication of at least one of the uplink buffer load threshold, the uplink channel load threshold, the uplink logical channel latency threshold and the type of service requiring uplink mapping.

There may be a plurality of different mapping options between the at least one uplink logical channel and at least one of the first uplink transport channel and the second uplink transport channel. Each mapping option may be associated with a respective at least one trigger.

The at least one uplink logical channel may be associated with an uplink logical channel group.

The control information may comprise an allocation of resources associated with at least one of the first uplink transport channel and the second uplink transport channel for the at least one uplink logical channel.

The method may comprise determining the mapping in dependence on whether the user device is operating in a discontinuous reception mode.

When the user device is capable of operating using multi-connectivity for uplink transmissions, wherein the uplink transmissions are transmitted via one or more of a plurality of uplink transmission channels, the method may comprise determining the mapping separately for each channel.

The mapping may comprise mapping the at least one uplink logical channel with the first uplink transport channel and the second uplink transport channel and the method may comprise causing the at least one uplink logical channel to be transmitted using the first uplink transport channel and the second uplink transport channel in parallel.

In a second aspect there is provided a method comprising determining, at a network node, control information being useable for mapping between at least one uplink logical channel and at least one of a first uplink transport channel and a second uplink transport channel and causing a transmission of the control information to a user device.

The method may comprise determining whether at least one trigger is present and determining the mapping in dependence on which of at least one trigger is present.

The control information may include an indication of the determined mapping.

The at least one trigger may be dependent on at least one of: an uplink buffer load threshold, an uplink channel load threshold, an uplink logical channel latency threshold and a type of service requiring uplink access.

The method may comprise providing, to a user device, an indication of at least one of the uplink buffer load threshold, the uplink channel load threshold, the uplink logical channel latency threshold and the type of service requiring uplink access.

The at least one uplink logical channel may comprise at least one of a dedicated traffic channel, a dedicated control channel, a common control channel, a common traffic channel and a channel carrying media access control messages.

The first uplink transport channel may comprise an uplink contention based channel. The second uplink transport channel may comprise an uplink shared channel.

The determined mapping may be valid for a first time period.

The method may comprise receiving a request from the user device to use a determined mapping.

There may be a plurality of different mapping options between the at least one uplink logical channel and at least one of the first uplink transport channel and the second uplink transport channel. Each mapping option may be associated with a respective at least one trigger.

The at least one uplink logical channel may be associated with an uplink logical channel group.

The control information may comprise an allocation of resources associated with at least one of the first uplink transport channel and the second uplink transport channel for the at least one uplink logical channel.

In a third aspect there is provided an apparatus, said apparatus comprising means for receiving, at a user device, control information usable for determining whether at least one uplink logical channel is to be transmitted using at least one of a first uplink transport channel and a second uplink transport channel, means for determining, in dependence on said information, a mapping between the at least one uplink logical channel and at least one of the first uplink transport channel and second uplink transport channel and means for causing the at least one uplink logical channel to be transmitted using the at least one uplink transport channel to which the at least one uplink logical channel is mapped.

The at least one uplink logical channel may comprise at least one of a dedicated traffic channel, a dedicated control channel, a common control channel, a common traffic channel and a channel carrying media access control messages.

The first uplink transport channel may comprise an uplink contention based channel. The second uplink transport channel may comprise an uplink shared channel.

The determined mapping may be valid for a first time period.

The control information may comprise an indication to map the at least one uplink logical channel with at least one of the first uplink transport channel and the second uplink transport channel. The indication may be determined in dependence on which of at least one trigger is present.

The apparatus may comprise means for determining whether at least one trigger is present and means for determining the mapping in dependence on which of at least one trigger is present.

The apparatus may comprise means for providing a request to a network node to use the determined mapping.

The at least one trigger may be dependent on at least one of an uplink buffer load threshold, an uplink channel load threshold, an uplink logical channel latency threshold and a type of service requiring uplink access.

The apparatus may comprise means for receiving, from a network node, an indication of at least one of the uplink buffer load threshold, the uplink channel load threshold, the uplink logical channel latency threshold and the type of service requiring uplink mapping.

There may be a plurality of different mapping options between the at least one uplink logical channel and at least one of the first uplink transport channel and the second uplink transport channel. Each mapping option may be associated with a respective at least one trigger.

The at least one uplink logical channel may be associated with an uplink logical channel group.

The control information may comprise an allocation of resources associated with at least one of the first uplink transport channel and the second uplink transport channel for the at least one uplink logical channel.

The apparatus may comprise means for determining the mapping in dependence on whether the user device is operating in a discontinuous reception mode.

When the user device is capable of operating using multi-connectivity for uplink transmissions, wherein the uplink transmissions are transmitted via one or more of a plurality of uplink transmission channels, the apparatus may comprise means for determining the mapping separately for each channel.

The mapping may comprise mapping the at least one uplink logical channel with the first uplink transport channel and the second uplink transport channel and the apparatus may comprise means for causing the at least one uplink logical channel to be transmitted using the first uplink transport channel and the second uplink transport channel in parallel.

In a fourth aspect there is provided an apparatus, said apparatus comprising means for determining, at a network node, control information being useable for mapping between at least one uplink logical channel and at least one of a first uplink transport channel and a second uplink transport channel and means for causing a transmission of the control information to a user device.

The apparatus may comprise means for determining whether at least one trigger is present and means for determining the mapping in dependence on which of at least one trigger is present.

The control information may include an indication of the determined mapping.

The at least one trigger may be dependent on at least one of: an uplink buffer load threshold, an uplink channel load threshold, an uplink logical channel latency threshold and a type of service requiring uplink access.

The apparatus may comprise means for providing, to a user device, an indication of at least one of the uplink buffer load threshold, the uplink channel load threshold, the uplink logical channel latency threshold and the type of service requiring uplink access.

The at least one uplink logical channel may comprise at least one of a dedicated traffic channel, a dedicated control channel, a common control channel, a common traffic channel and a channel carrying media access control messages.

The first uplink transport channel may comprise an uplink contention based channel. The second uplink transport channel may comprise an uplink shared channel.

The determined mapping may be valid for a first time period.

The apparatus may comprise means for receiving a request from the user device to use a determined mapping.

There may be a plurality of different mapping options between the at least one uplink logical channel and at least one of the first uplink transport channel and the second uplink transport channel. Each mapping option may be associated with a respective at least one trigger.

The at least one uplink logical channel may be associated with an uplink logical channel group.

The control information may comprise an allocation of resources associated with at least one of the first uplink transport channel and the second uplink transport channel for the at least one uplink logical channel.

In a fifth aspect there is provided an apparatus comprising at least one processor and at least one memory including a computer program code, the at least one memory and the computer program code configured to, with the at least one processor, cause the apparatus at least to receive, at a user device, control information usable for determining whether at least one uplink logical channel is to be transmitted using at least one of a first uplink transport channel and a second uplink transport channel, determine, in dependence on said information, a mapping between the at least one uplink logical channel and at least one of the first uplink transport channel and second uplink transport channel and cause the at least one uplink logical channel to be transmitted using the at least one uplink transport channel to which the at least one uplink logical channel is mapped.

The at least one uplink logical channel may comprise at least one of a dedicated traffic channel, a dedicated control channel, a common control channel, a common traffic channel and a channel carrying media access control messages.

The first uplink transport channel may comprise an uplink contention based channel. The second uplink transport channel may comprise an uplink shared channel.

The determined mapping may be valid for a first time period.

The control information may comprise an indication to map the at least one uplink logical channel with at least one of the first uplink transport channel and the second uplink transport channel. The indication may be determined in dependence on which of at least one trigger is present.

The apparatus may be configured to determine whether at least one trigger is present and determine the mapping in dependence on which of at least one trigger is present.

The apparatus may be configured to provide a request to a network node to use the determined mapping.

The at least one trigger may be dependent on at least one of an uplink buffer load threshold, an uplink channel load threshold, an uplink logical channel latency threshold and a type of service requiring uplink access.

The apparatus may be configured to receive, from a network node, an indication of at least one of the uplink buffer load threshold, the uplink channel load threshold, the uplink logical channel latency threshold and the type of service requiring uplink mapping.

There may be a plurality of different mapping options between the at least one uplink logical channel and at least one of the first uplink transport channel and the second uplink transport channel. Each mapping option may be associated with a respective at least one trigger.

The at least one uplink logical channel may be associated with an uplink logical channel group.

The control information may comprise an allocation of resources associated with at least one of the first uplink transport channel and the second uplink transport channel for the at least one uplink logical channel.

The apparatus may be configured to determine the mapping in dependence on whether the user device is operating in a discontinuous reception mode.

When the user device is capable of operating using multi-connectivity for uplink transmissions, wherein the uplink transmissions are transmitted via one or more of a plurality of uplink transmission channels, the apparatus may be configured to determine the mapping separately for each channel.

The mapping may comprise mapping the at least one uplink logical channel with the first uplink transport channel and the second uplink transport channel and the apparatus may be configured to cause the at least one uplink logical channel to be transmitted using the first uplink transport channel and the second uplink transport channel in parallel.

In a sixth aspect there is provided an apparatus, said apparatus comprising at least one processor and at least one memory including a computer program code, the at least one memory and the computer program code configured to, with the at least one processor, cause the apparatus at least to determine, at a network node, control information being useable for mapping between at least one uplink logical channel and at least one of a first uplink transport channel and a second uplink transport channel and cause a transmission of the control information to a user device.

The apparatus may be configured to determine whether at least one trigger is present and means for determining the mapping in dependence on which of at least one trigger is present.

The control information may include an indication of the determined mapping.

The at least one trigger may be dependent on at least one of: an uplink buffer load threshold, an uplink channel load threshold, an uplink logical channel latency threshold and a type of service requiring uplink access.

The apparatus may be configured to provide, to a user device, an indication of at least one of the uplink buffer load threshold, the uplink channel load threshold, the uplink logical channel latency threshold and the type of service requiring uplink access.

The at least one uplink logical channel may comprise at least one of a dedicated traffic channel, a dedicated control channel, a common control channel, a common traffic channel and a channel carrying media access control messages.

The first uplink transport channel may comprise an uplink contention based channel. The second uplink transport channel may comprise an uplink shared channel.

The determined mapping may be valid for a first time period.

The apparatus may be configured to receive a request from the user device to use a determined mapping.

There may be a plurality of different mapping options between the at least one uplink logical channel and at least one of the first uplink transport channel and the second uplink transport channel. Each mapping option may be associated with a respective at least one trigger.

The at least one uplink logical channel may be associated with an uplink logical channel group.

The control information may comprise an allocation of resources associated with at least one of the first uplink transport channel and the second uplink transport channel for the at least one uplink logical channel.

In a seventh aspect there is provided a computer program embodied on a non-transitory computer-readable storage medium, the computer program comprising program code for controlling a process to execute a process, the process comprising receiving, at a user device, control information usable for determining whether at least one uplink logical channel is to be transmitted using at least one of a first uplink transport channel and a second uplink transport channel, determining, in dependence on said information, a mapping between the at least one uplink logical channel and at least one of the first uplink transport channel and second uplink transport channel and causing the at least one uplink logical channel to be transmitted using the at least one uplink transport channel to which the at least one uplink logical channel is mapped.

The at least one uplink logical channel may comprise at least one of a dedicated traffic channel, a dedicated control channel, a common control channel, a common traffic channel and a channel carrying media access control messages.

The first uplink transport channel may comprise an uplink contention based channel. The second uplink transport channel may comprise an uplink shared channel.

The determined mapping may be valid for a first time period.

The control information may comprise an indication to map the at least one uplink logical channel with at least one of the first uplink transport channel and the second uplink transport channel. The indication may be determined in dependence on which of at least one trigger is present.

The process may comprise determining whether at least one trigger is present and determining the mapping in dependence on which of at least one trigger is present.

The process may comprise providing a request to a network node to use the determined mapping.

The at least one trigger may be dependent on at least one of an uplink buffer load threshold, an uplink channel load threshold, an uplink logical channel latency threshold and a type of service requiring uplink access.

The process may comprise receiving, from a network node, an indication of at least one of the uplink buffer load threshold, the uplink channel load threshold, the uplink logical channel latency threshold and the type of service requiring uplink mapping.

There may be a plurality of different mapping options between the at least one uplink logical channel and at least one of the first uplink transport channel and the second uplink transport channel. Each mapping option may be associated with a respective at least one trigger.

The at least one uplink logical channel may be associated with an uplink logical channel group.

The control information may comprise an allocation of resources associated with at least one of the first uplink transport channel and the second uplink transport channel for the at least one uplink logical channel.

The process may comprise determining the mapping in dependence on whether the user device is operating in a discontinuous reception mode.

When the user device is capable of operating using multi-connectivity for uplink transmissions, wherein the uplink transmissions are transmitted via one or more of a plurality of uplink transmission channels, the process may comprise determining the mapping separately for each channel.

The mapping may comprise mapping the at least one uplink logical channel with the first uplink transport channel and the second uplink transport channel and the method may comprise causing the at least one uplink logical channel to be transmitted using the first uplink transport channel and the second uplink transport channel in parallel.

In an eighth aspect there is provided a computer program embodied on a non-transitory computer-readable storage medium, the computer program comprising program code for controlling a process to execute a process, the process comprising determining, at a network node, control information being useable for mapping between at least one uplink logical channel and at least one of a first uplink transport channel and a second uplink transport channel and causing a transmission of the control information to a user device.

The process may comprise determining whether at least one trigger is present and determining the mapping in dependence on which of at least one trigger is present.

The control information may include an indication of the determined mapping.

The at least one trigger may be dependent on at least one of: an uplink buffer load threshold, an uplink channel load threshold, an uplink logical channel latency threshold and a type of service requiring uplink access.

The process may comprise providing, to a user device, an indication of at least one of the uplink buffer load threshold, the uplink channel load threshold, the uplink logical channel latency threshold and the type of service requiring uplink access.

The at least one uplink logical channel may comprise at least one of a dedicated traffic channel, a dedicated control channel, a common control channel, a common traffic channel and a channel carrying media access control messages.

The first uplink transport channel may comprise an uplink contention based channel. The second uplink transport channel may comprise an uplink shared channel.

The determined mapping may be valid for a first time period.

The process may comprise receiving a request from the user device to use a determined mapping.

There may be a plurality of different mapping options between the at least one uplink logical channel and at least one of the first uplink transport channel and the second uplink transport channel. Each mapping option may be associated with a respective at least one trigger.

The at least one uplink logical channel may be associated with an uplink logical channel group.

The control information may comprise an allocation of resources associated with at least one of the first uplink transport channel and the second uplink transport channel for the at least one uplink logical channel.

In a ninth aspect there is provided a method comprising determining, at a transmitting device (such as a eNB or a remote radio head or central processing entity in case of shared architecture), a mapping between at least one downlink logical channel and at least one of a first downlink transport channel and a second downlink transport channel and causing the at least one downlink logical channel to be transmitted using the at least one downlink transport channel to which the at least one downlink logical channel is mapped.

In a tenth aspect there is provided a method comprising determining, at a receiving device (such as a UE), information being useable for mapping between at least one downlink logical channel and at least one of a first downlink transport channel and a second downlink transport channel and causing a transmission of the control information to a transmitting device (such as eNB).

In an eleventh aspect, there is provided an apparatus comprising means for performing a method according to the ninth and/or tenth aspect.

In a twelfth aspect there is provided an apparatus, said apparatus comprising at least one processor and at least one memory including a computer program code, the at least one memory and the computer program code configured to determine, at a transmitting device (such as a eNB or a remote radio head or central processing entity in case of shared architecture), a mapping between at least one downlink logical channel and at least one of a first downlink transport channel and a second downlink transport channel and cause the at least one downlink logical channel to be transmitted using the at least one downlink transport channel to which the at least one downlink logical channel is mapped.

In a thirteenth aspect there is provided an apparatus, said apparatus comprising at least one processor and at least one memory including a computer program code, the at least one memory and the computer program code configured to determine, at a receiving device (such as a UE), information being useable for mapping between at least one downlink logical channel and at least one of a first downlink transport channel and a second downlink transport channel and cause a transmission of the control information to a transmitting device (such as eNB).

In a fourteenth aspect there is provided a computer program embodied on a non-transitory computer-readable storage medium, the computer program comprising program code for controlling a process to execute a process, the process comprising determining, at a transmitting device (such as a eNB or a remote radio head or central processing entity in case of shared architecture), a mapping between at least one downlink logical channel and at least one of a first downlink transport channel and a second downlink transport channel and causing the at least one downlink logical channel to be transmitted using the at least one downlink transport channel to which the at least one downlink logical channel is mapped.

In a fifteenth aspect there is provided a computer program embodied on a non-transitory computer-readable storage medium, the computer program comprising program code for controlling a process to execute a process, the process comprising determining, at a receiving device (such as the UE), information being useable for mapping between at least one downlink logical channel and at least one of a first downlink transport channel and a second downlink transport channel and causing a transmission of the control information to a transmitting device (such as eNB).

In an aspect there is provided a computer program product for a computer, comprising software code portions for performing the steps the method of the first aspect, the second aspect, the ninth aspect or the tenth aspect when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 4 shows a flowchart of an example method;

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
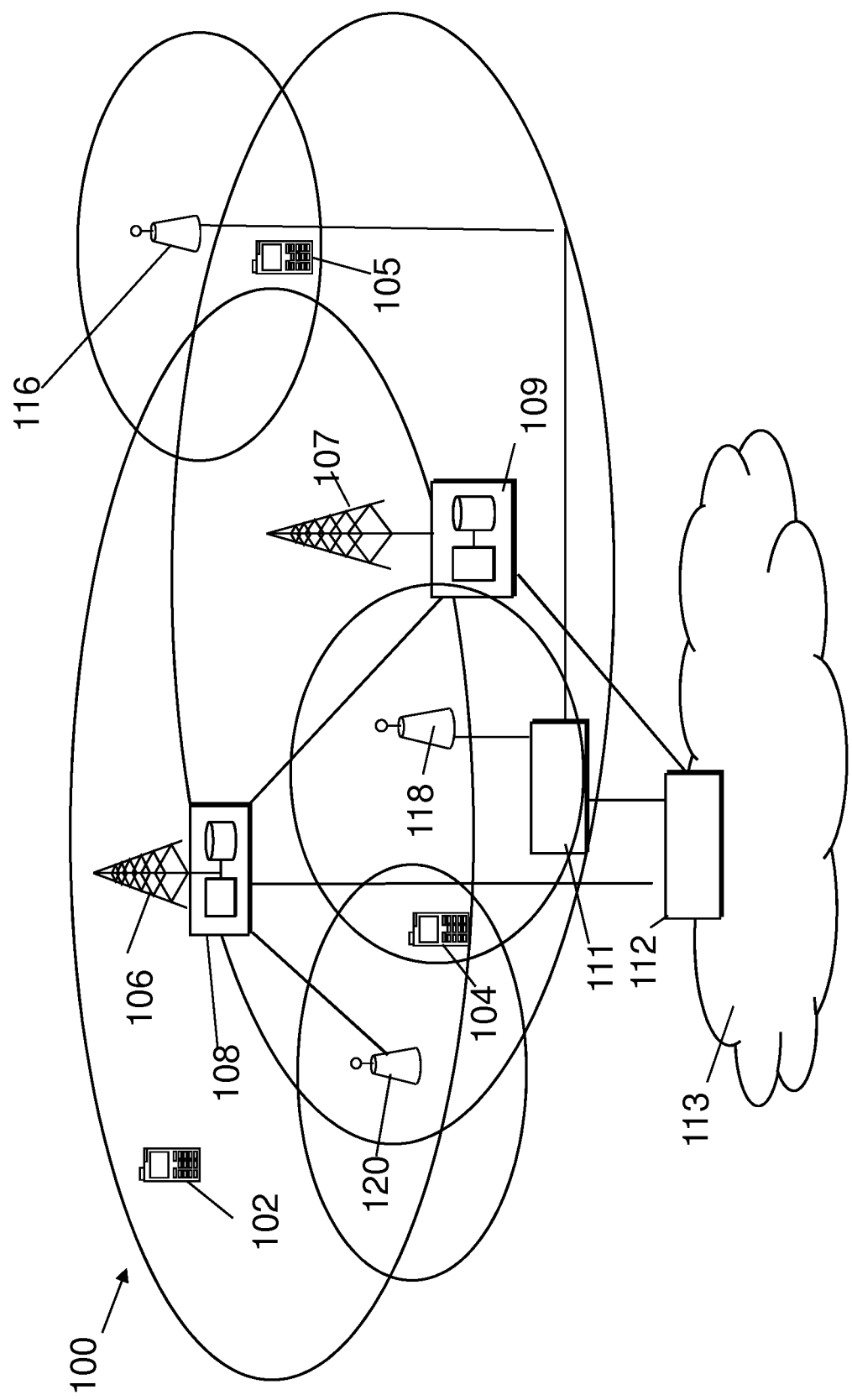
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2:
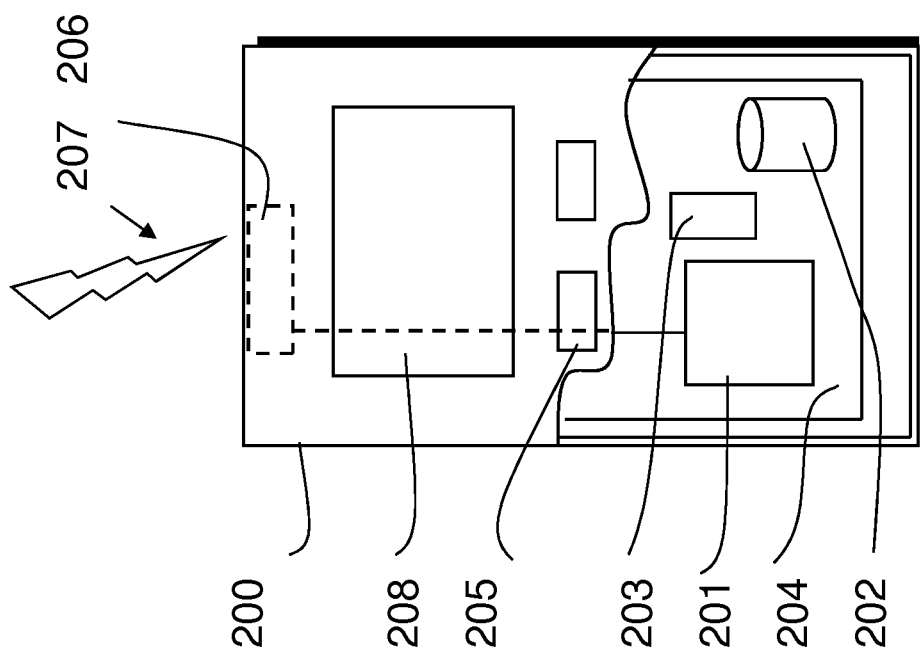
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on. Signalling mechanisms and procedures, which may enable a device to address in-device coexistence (IDC) issues caused by multiple transceivers, may be provided with help from the LTE network. The multiple transceivers may be configured for providing radio access to different radio technologies.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

The embodiments are not, however, restricted to the system given as an example but a person skilled in the art may apply the solution to other communication systems provided with necessary properties. Another example of a suitable communications system is the 5G concept. Network architecture in 5G may be similar to that of the LTE-advanced. 5G may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

The radio system may support so called dual connectivity where UE may be communicating/connected/associated simultaneously with/to at least two access points or network nodes. Dual connectivity may be generalized to a situation where UE may support multi-connectivity, i.e. communication with more than two access points or network nodes and would not thus be limited to only two radio connections.

In LTE-A multiple carriers may be used to transmit and receive data between network and UE. More than one carrier may be aggregated in contiguous or non-contiguous manner to provide wider bandwidth and thus increase the peak bitrates. Multiple carriers may be used in UL direction, DL direction or both. This radio system featured is referred as carrier aggregation (CA).

One envisioned technology component for 5G is support for contention based access. Contention based access may be first specified for uplink (UL) direction (and later complemented by introducing contention based access also for DL direction), aiming for efficient and fast support of infrequent small-data e.g. for machine type communications (MTC). MTC is only one example application in which contention based access may be used and other suitable applications are possible. Contention based access may be beneficial to use when the access point is not under heavy load. In one example of layer 2 (L2) implementation of UL contention based channel in the context of 3GPP MAC layer, logical common traffic channel (CTCH) may be mapped to uplink contention based channel (UL-CONT-CH).

UL-CONT-CH is a transport channel and it is mapped to specific set of physical layer resources which are configured in semi-static or static manner via higher layer signalling.

The UL-SCH and UL-CONT-CH may be mapped to physical layer resources on a licensed band, in another option the UL-CONT-CH may be mapped to unlicensed band resources while UL-SCH is on licensed spectrum. Alternatively, both UL-SCH and UL-CONT-CH may operate on unlicensed spectrum as well.

In the case where UL-CONT-CH is mapped to unlicensed band resources, UE may access the channel using an appropriate transmission method e.g. the UE may incorporate Listen-Before-Talk before transmitting, utilizing other frame formats, additional synchronization signals etc.

Figure 3:
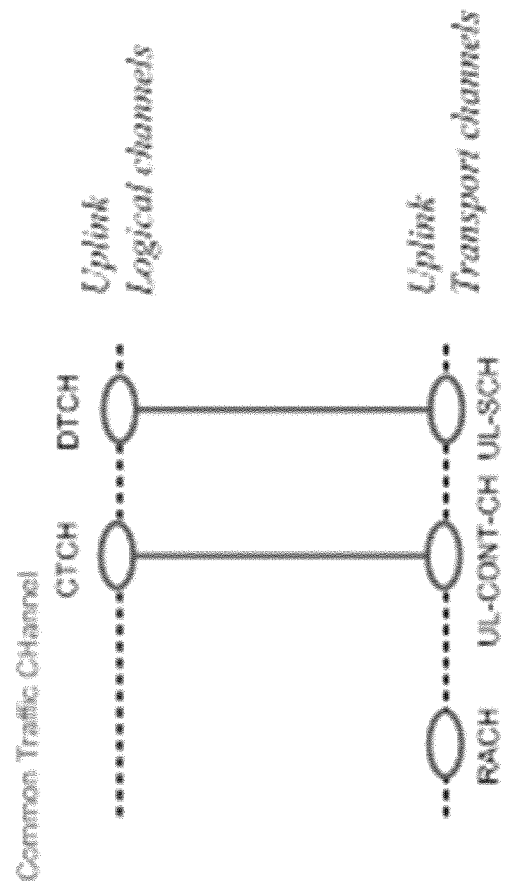
FIG. 3 shows a schematic diagram of channel mapping.

An example mapping of channels is illustrated in FIG. 3. In FIG. 3, the CTCH is mapped to the UL-CONT-CH and the DTCH (dedicated traffic channel) mapped to the Uplink Shared Channel, as an example. The random access channel (RACH) is also illustrated in FIG. 3.

The following relates to efficient utilization of UL-CONT-CH for UL transmissions of individual UEs or, that is, opportunistic use of UL-CONT-CH for UL DTCH and further UE specific control signalling. Although UL-CONT-CH is described, embodiments may be generalized so that the UL-CONT-CH and associated mappings are applicable in the downlink direction.

Efficient transmissions of infrequent, delay-tolerable, small-size messages of MTC and the like over a 5G air interface using contention based direct access has been considered. Although the following is described with reference to MTC, MTC is only one example of an application which will benefit from using contention based access and embodiments may be applicable to other applications suitable for contention based access. Alternatively, or in addition, to support of MTC, there may be other potential use cases for adopting UL contention based transport channel(s), UL-CONT-CH(s). In one example, considering typical small cells in a 5G ultra dense network, the number of users being served by a small cell is expected to be relatively small at any given time. Therefore, with a proper provisioning and configuration of contention based channel resources, possible collision of in-frequent or small-data radio transmissions from different users over the contention based channel may be low. Therefore, utilizing UL-CONT-CH for sending, e.g., a medium access control (MAC) scheduling request, buffer status report (or any MAC CE) or certain kinds of higher-layer packets (RRC messages or alike) such as control-type protocol data units (PDUs) or special small data-type PDUs (such as those which carry delay-sensitive non-payload TCP SYNC or ACK), may be sufficient. In another example, popular messenger applications with small-size messages may utilize UL-CONT-CH(s) as well since UE may transmit all the pending data e.g. in one or few transmissions and enter DRX.

ARQ mechanisms may be applied to UL-CONT-CH transmission. Such ARQ mechanisms may be MAC level ARQ, HARQ (Hybrid ARQ) or a sequence based feedback similar as PUCCH (Physical Uplink Control Channel) in UL.

FIG. 4 provides a flowchart of an example method. In a first step 420, the method comprises receiving, at a user device, control information useable for determining whether at least one uplink logical channel is to be transmitted using at least one of a first uplink transport channel and a second uplink transport channel.

In a second step 440, the method comprises determining, in dependence on said information a mapping between the at least one uplink logical channel and at least one of the first uplink transport channel and second uplink transport channel.

In a third step 460, the method comprises causing the at least one uplink logical channel to be transmitted using the at least one uplink transport channel to which the at least one uplink logical channel is mapped.

Figure 5:
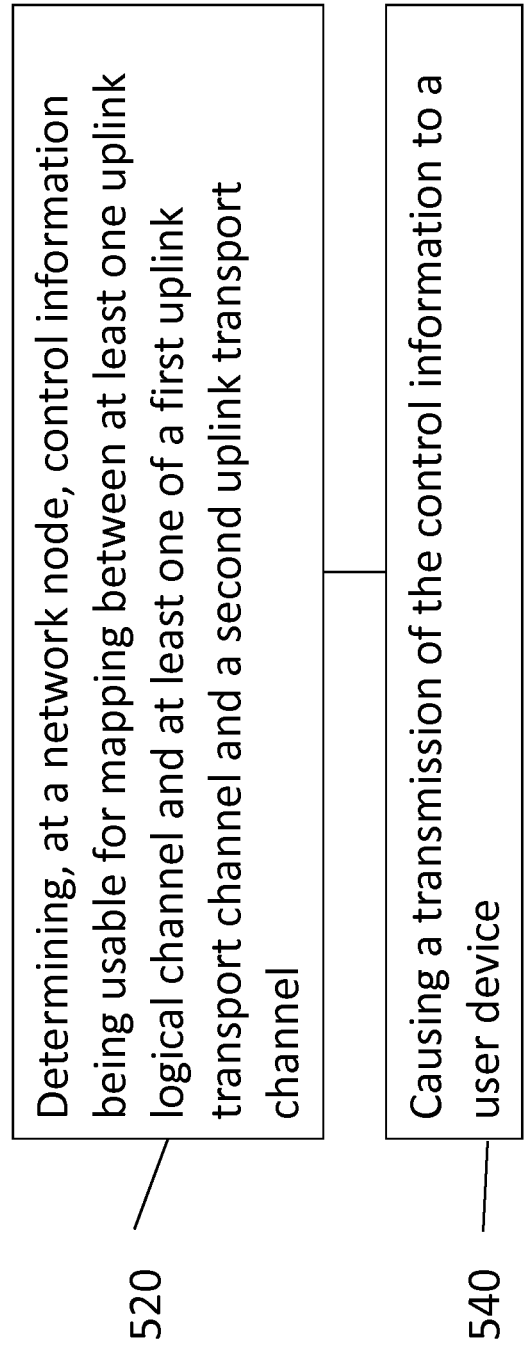
FIG. 5 shows a flowchart of an example method.

FIG. 5 provides a flowchart of an example method. In a first step 520, the method comprises determining, at a network node, control information being usable for mapping between at least one uplink logical channel and at least one of a first uplink transport channel and a second uplink transport channel.

In a second step 540, the method comprises causing a transmission of the control information to a user device.

The at least one first uplink logical channel may comprise at least one of a dedicated traffic channel (DTCH), a dedicated control channel (DCCH), a common control channel (CCCH), a common traffic channel (CTCH) and a channel carrying media access control (MAC) messages. The at least one first uplink logical channel may be associated with or belong to an uplink logical channel group. The mapping may be determined for the uplink logical channel group. An uplink logical channel group may be characterized by a pre-configured scheduling priority or QoS profile.

The first uplink transport channel may comprise an uplink contention based channel, e.g., UL-CONT-CH. The second uplink transport channel may comprise an uplink shared channel, e.g. UL-SCH.

A method such as that described with reference to FIGS. 4 and 5 may provide a method of facilitating and controlling dynamic mapping of uplink logical channels such as Dedicated Traffic Channel (DTCH), Dedicated Control Channel (DCCH) or Common Control Channel (CCCH) between a first and second uplink transport channel, e.g. UL-CONT- CH and UL-SCH. Embodiments described herein may enhance radio resource utilization and quality of service (QoS) for the serving UE.

A network node may determine the mapping between the at least one first uplink logical channel and at least one of the first and second uplink transport channels. The network node may provide an indication of the determined mapping to a user device. That is, the control information may comprise an indication to map the at least one uplink logical channel with at least one of the first uplink transport channel and the second uplink transport channel.

The control information may comprise an allocation of resources associated with at least one of the first uplink transport channel and the second uplink transport channel. In one embodiment NW may configure dedicated UL-CONT-CH resource for a UE or for a specific UL logical channel. UE may access the resources in random access manner. Such resources may be reserved e.g. from the pool of UL-CONT-CH resources A user device may provide a request to a network node (NW) to change the current mapping for UL transport channels. Alternatively, or in addition, a user device may be configured to determine the mapping autonomously. A UE may request mapping or determine the mapping autonomously when a new logical channel is established (or a new service is started).

UE based or UE initiated/autonomous operation may be preferable if UL-CONT-CH(s) is (are) semi-statically configured. NW based operation may be preferable if more dynamic resource allocation is used for UL-CONT-CH(s).

Figure 6:
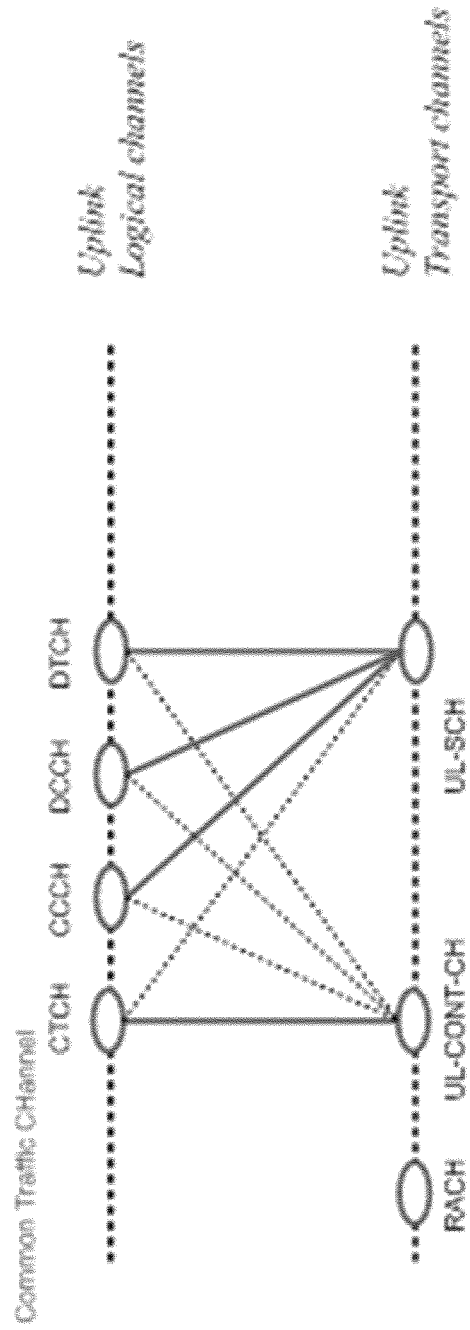
FIG. 6 shows a schematic diagram of example mapping of logical channels to transport channels according to embodiments.

There may be a plurality of mapping options between the at least one uplink logical channel and the at least one of the first uplink transport channel and the second uplink transport channel. FIG. 6 shows an illustration of mapping options for UL logical channels CTCH, CCCH, DCCH and DTCH to first and second uplink transport channels UL-CONT-CH and UL-SCH transport channels. The variety of mapping options may include every possible combination of mapping one or more of the uplink logical channels, such as those shown in FIG. 6, to one or both of the first and second uplink transport channels, such as those shown in FIG. 6.

Each mapping option of the plurality of mapping options may be associated with at least one trigger. The method may comprise, determining at the user device or at a network node whether at least one trigger is present and determining the mapping in dependence on which of the at least one trigger is present.

The triggers may be based on, e.g., configured threshold parameters and the threshold values of the parameters, application awareness and QoS characteristics of the DTCH data traffic, conditions or statuses of the UE and serving cell etc. The parameters may be measured and/or reported by either the network node, the user device or both.

In one embodiment, a network node of the serving radio access network (referred to as NW) may determine and control mapping of UL Transport channel (CTCH, CCCH, DCCH, DTCH) between UL-CONT-CH and UL-SCH dynamically based on parameters and/or threshold levels as described below. Alternatively, or in addition, a user device may determine and control mapping of UL Transport channel (CTCH, CCCH, DCCH, DTCH) between UL-CONT-CH and UL-SCH dynamically based on parameters and/or threshold levels as described below.

In general, one trigger may be associated with one type of parameter, such as buffer level, channel load, channel latency, type of service/application requiring uplink access, to mention only a few non-limiting examples. There may be one or more triggers to be checked before determining the mapping for a user device. As discussed, there may be a plurality of different types of mapping options and each mapping may be associated with a respective trigger(s). Thus, determining mapping may depend on which of the at least one trigger is present. The triggers may vary e.g. in terms of the associated threshold level, how the "trigger being present" is defined (e.g., whether the trigger is present when a threshold level is exceeded or not exceeded), type of triggers (e.g. for some mapping options, a trigger related to latency need not be considered while for other kind of mapping latency-related trigger(s)/threshold(s) may be important).

A trigger being present may denote that a parameter, e.g., a measured/reported buffer level, exceeds a predetermined threshold. This may indicate the type of mapping option to be applied between the at least one first logical channel and the first and second transport channels. Alternatively, the presence of a trigger may be that a measured/reported parameter does not exceed a threshold. This trigger may be associated with a different one of the plurality of mapping options.

In other words, if a respective trigger(s) (e.g., buffer level above buffer threshold) is/are present, then a an associated mapping option may be determined by an network node, e.g. eNB, or determined autonomously by the user device, whereas if a different trigger is/are present (e.g., latency higher than latency threshold), then a different associated mapping option may be determined by a network node or a UE.

In the case of determining mapping at the UE, the UE may receive threshold values from the network node. For example, the user device may receive an indication of at least one of the uplink buffer load threshold, the uplink channel load threshold, the uplink logical channel latency threshold and the type of service requiring mapping.

In one example, a trigger is dependent on UL buffer level. In an embodiment, when a UE has a low amount (below a threshold value) of data to be transmitted, the UE may be configured to transmit the data on a contention based channel, e.g., UL-CONT-CH. When the UL buffer level threshold is exceeded (based on BSR), the UE may provide a request to a NW for mapping of a first logical channel to a non-contention based channel, e.g. UL-SCH, or the UE may be configured to transmit the data on the UL-SCH.

In one example, exceeding a threshold level may trigger a UE to switch mapping to UL-SCH without providing a request to a network node. When buffer level is again below the threshold UE may or may not switch to UL-CONT-CH mapping. Mapping may be configured based on MAC PDU size and thus PDU basis.

In one embodiment, the trigger may be dependent on UL-CONT-CH load (resource utilization (e.g. average length of transmission) or number of collisions, used MCS or alike). The UL-CONT-CH load may be measured by the network or UE (e.g. as per network request).

In one embodiment, the trigger may be dependent on measured and/or reported L2 latency. A NW may have specific latency threshold for determining the UL logical channel mapping to specific transport channel.

A UE may estimate and report queuing latency for the at least one logical channel, e.g., an UL logical channel, logical channel group or all the logical channels (e.g. average latency or highest seen latency of logical channel mapped to UL-CONT-CH). A NW may estimate the L2 latency by requesting the system frame number (of the original transmission) to be included (e.g. as a MAC CE) in the transmitted or retransmitted MAC PDU.

In an embodiment, a specific service may have a requirement which requires mapping to either UL-CONT-CH or UL-SCH. NW may configure UL logical channel mapping based on the service requirement. If the specific service requires periodical or frequent UL access, the NW may be configured to map the at least one uplink logical channel to UL-SCH. Alternatively, if a service may require occasional or in-frequent access (e.g. some service classified to be Best Effort) on UL NW may configure the initial mapping of the at least one uplink to UL-CONT-CH.

The UE may indicate to the network observed transmission related parameters such as a number of retransmissions per packet (e.g. reported periodically or upon request) which NW may use to determine mapping.

A network node may provide an indication that mapping of the at least one logical channel to at least one of the first and second transport channels may be determined at the user device. The NW may signal per UE/UE group basis to allow/deny mapping of UL logical channel to UL-CONT-CH. Such signaling may be done e.g. by using MAC CE or RRC signaling.

The determined mapping may be valid for a first time period. A network node may provide an indication in, e.g., system information to prevent mapping of an uplink logical channel to a contention based channel, e.g., UL-CONT-CH. A NW may signal the indication by using prohibit timer, wherein mapping is not allowed when timer is running. Alternatively a timer may be used to allow mapping for specific time. Different timers may be configured for different logical channels or logical channel groups.

Alternatively such mapping of a first logical channel to a contention based channel may be denied implicitly by allocating no resources for the UL-CONT-CH.

The mapping may be determined in dependence on whether a user device is operating in discontinuous reception (DRX) mode. A UE in DRX mode may use specific logical channel/or channels mapped to UL-CONT-CH to transmit small amount of data (e.g. "keep alive"/best effort/background traffic) without exiting DRX or requesting DRX deactivation. Specific thresholds for amount of data (or a single PDU size) may be configured by network. In one further example such communication may occur also on DL direction (in DL CONT-CH).

In one embodiment NW may configure parallel mapping of UL transport channel, logical channel or logical channel group to UL-CONT-CH and UL-SCH. Where the mapping comprises mapping the at least one logical channel with both of the first uplink transport channel and the second uplink transport channel, the at least one uplink logical channel may be transmitted using the first uplink transport channel and the second uplink transport channel in parallel.

Additionally, or alternatively, in parallel mapping configuration the UE may transmit e.g. in-frequent but high-priority traffic on UL-CONT-CH while waiting for scheduling assignment, or in parallel with, scheduled transmission of the same data.

When configured for parallel mapping, a UE may autonomously switch transmission between the UL-CONT-CH and UL-SCH. Such switch may be based on one, or a combination of, collision rates, observed data rate and latency. In one example if the first (or second) transmission failure rate is above certain threshold UE may switch to mapping traffic to UL-SCH for certain period of time (or until the buffer is empty/connection is released) before attempting transmit on UL-CONT-CH. In another example, during random back-off (back-off timer may be used if transmission is collided on UL-CONT-CH) UE may use UL-SCH.

In one example, a UE may have multiple UL-CONT-CHs, e.g., where one UL-CONT-CH is mapped to a licensed band and one UL-CONT-CH is mapped to an unlicensed band. The mapping principles and methods described with reference to FIGS. 4 and 5 may apply also across different UL-CONT-CHs. One example of this could be for dual connectivity, or multi-connectivity.

A method may be applicable for use in multi-connectivity (4G-5G or 5G-5G) with possible UL bearer split and related trigger to map traffic between UL-SCH and UL-CONT-CH. When a user device is capable of operating using multi-connectivity for UL transmissions, that is, wherein the uplink transmissions are transmitted using one or more of a plurality of UL transmission channels, the mapping may be determined separately for each channel. In an example embodiment, a user device may be configured to map UL Transport channel e.g. DTCH on UL-SCH in one radio leg (5G or LTE) and on UL-CONT-CH in another 5G radio leg. The traffic mapping may be as described mentioned in earlier embodiments (e.g. based on the logical channels) or it may further depend on DTCH data characteristics: small data with possible per-packet priorities or differentiations; transmissions mapped on UL-SCH may be used e.g. for retransmissions (first 1 or 2 attempts over UL-CONT-CH have failed).

In one further example, a UE may communicate with a network using multiple aggregated carriers (e.g. CA). As an example, UE may map UL-SCH to one carrier and UL-CONT-CH to another carrier where these carriers may be a primary component carrier or secondary component carrier. Multiple carriers may be aggregated (licensed band and/or unlicensed band) such that multiple CONT-CH are present. The mapping of logical channels to CONT-CH according to embodiments may be applied. CA communication and the mappings of the CONT-CH are applicable for UL and DL direction.

In one example embodiment, mapping controls of UL DCCH, CCCH, and MAC messages between UL SCH and UL-CONT-CH may be as follows.

NW may allocate certain UL-CONT-CH (UL-CONT-CH resources) dedicated for possible transmissions of UL DCCH, CCCH or MAC messages.

A NW may indicate on-the-fly using RRC/MAC CE signaling or PDCCH or some designated control signal whether UE is allowed to transmit UL DCCH, CCCH or MAC messages on certain configured UL-CONT-CH.

A NW may configure UE with information on what kinds of UL DCCH, CCCH or MAC messages and may be sent on UL-CONT-CH (and otherwise on UL SCH) and further associated triggers to send.

In one example, if the UE is in DRX of CONNECTED state and has a need to transmit, the UE may use CONT-CH to send a short scheduling request/buffer status (along with some data) or a connection re-establishment request (e.g. a MAC CE) to NW right away. In general UE may send any MAC CE or RRC messages In another example, if UL DCCH, CCCH or MAC messages have their length under a preconfigured threshold (explicit or implicit) and moderate reliability-latency requirements then UE may be configured to send them on either UL-CONT-CH or SCH whichever opportunity comes first or both for enhancing reliability-latency or if the scheduled UL grant is not enough to send the intended UL data including UL DCCH, CCCH or MAC messages.

It should be understood that each block of the flowcharts of the Figures and any combination thereof may be implemented by various means or their combinations, such as hardware, software, firmware, one or more processors and/or circuitry.

Figure 7:
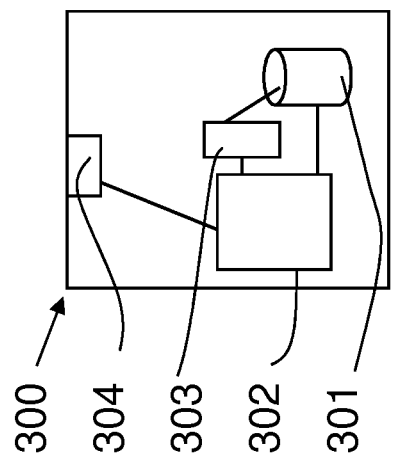
FIG. 7 shows a schematic diagram of an example control apparatus.

A method as described with reference to FIG. 4 may be implemented on a mobile device as described with respect to FIG. 2. A method as described with reference to FIG. 5 may be implemented using a control apparatus as shown in FIG. 7. FIG. 7 shows an example of a control apparatus for a communication system, for example to be coupled to and/or for controlling a station of an access system, such as a RAN node, e.g. a base station, (e) node B or 5G AP, a central unit of a cloud architecture or a node of a core network such as an MME or S-GW, a scheduling entity, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 or processor 201 can be configured to execute an appropriate software code to provide the control functions. Control functions may comprise receiving, at a user device, control information usable for determining whether at least one uplink logical channel is to be transmitted using at least one of a first uplink transport channel and a second uplink transport channel, determining, in dependence on said information, a mapping between the at least one uplink logical channel and at least one of the first uplink transport channel and second uplink transport channel and causing the at least one uplink logical channel to be transmitted using the at least one uplink transport channel to which the at least one uplink logical channel is mapped.

Alternatively or in addition, control functions may comprise determining, at a network node, control information being useable for mapping between at least one uplink logical channel and at least one of a first uplink transport channel and a second uplink transport channel and causing a transmission of the control information to a user device.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 5G networks and MTC, similar principles maybe applied in relation to other networks and communication systems, for example, LTE/LTE-A networks and other applications where contention based access may be used.

Although the above has described with CONT-CH in the UL direction, mapping according to embodiments may also be applicable in downlink direction. For downlink related application, a method may include steps of 1) determining, at a transmitting device (such as a eNB or a remote radio head or central processing entity in case of shared architecture), a mapping between at least one downlink logical channel and at least one of a first downlink transport channel and a second downlink transport channel; and 2) causing the at least one downlink logical channel to be transmitted using the at least one downlink transport channel to which the at least one downlink logical channel is mapped. In one embodiment, the mapping may be dependent on information received from a user equipment associated with the to-be-mapped channel. The information from the UE may comprise e.g. uplink buffer status reports (BSR), channel quality feedback, etc. In one embodiment, the information from the UE may comprise an indication of desired mapping. In one embodiment, similarly as in the UL related application, the mapping may be determined in dependence on whether one or more relevant triggers are present or not. These triggers may be dependent on one or more of e.g. DL buffer load threshold, an DL channel load threshold, an DL logical channel latency threshold and a type of service requiring DL access. Also the uplink related thresholds may be considered for the DL mapping, as well as the channel quality. Each mapping option may be associated with a certain at least one trigger. In one embodiment, the DL mapping may be performed separately for each served UE.

DL application may also include steps of 1) determining, at a receiving device (such as the UE), information being useable for mapping between at least one downlink logical channel and at least one of a first downlink transport channel and a second downlink transport channel; and 2) causing a transmission of the control information to a transmitting device (such as eNB). It should be further noted that above mentioned embodiments described with reference to UL are applicable to the DL solution as well, with simply changing uplink to downlink. For example, in the downlink case, the at least one downlink logical channel may comprise at least one of a dedicated traffic channel, a dedicated control channel, a common control channel, a common traffic channel and a channel carrying media access control messages, and the first downlink transport channel comprises an downlink contention based channel and the second downlink transport channel comprises an downlink shared channel. In one embodiment, the determined mapping may be valid for a time period. In one embodiment, the downlink mapping may be determined in dependence on whether the user device is operating in a discontinuous reception mode. In one embodiment, the DL mapping may comprise mapping the at least one DL logical channel with the first DL transport channel and the second DL transport channel. In such case, the eNB may transmit the at least one DL logical channel using the first DL transport channel and the second DL transport channel in parallel. In case of carrier aggregation, the DL mapping of each DL transmission leg may be performed independently of the other.

Alternatively or in addition to the proposed mapping is possible also for device-to-device (D2D) communication. In D2D communication a Master UE in D2D pair or a Cluster Head/Master UE in group communication (group of D2D UEs) can be seen as a controlling entity in similar manner as eNB throughout this application. D2D communication is also referred as machine-to-machine communication. The proposed dynamic mapping is also applicable to vehicle-to-vehicle (V2V) or vehicle-to-infrastructure (V2I) communication, or in general V2X type of communication. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A method comprising:
receiving, at a user device, control information usable for determining whether an uplink logical channel is to be transmitted using at least one uplink transport channel of a plurality of uplink transport channels of different uplink transport channel types, the plurality of uplink transport channels includes at least a first uplink transport channel of a first uplink transport channel type and a second uplink transport channel of a second uplink transport channel type different from the first uplink transport channel type, wherein there are a plurality of different mapping options between the uplink logical channel and the at least one uplink transport channel of the plurality of uplink transport channels of different uplink transport channel types;
determining whether at least one trigger, of a plurality of triggers, is present;
determining, in dependence on said control information and on which of at least one trigger is present of the plurality of triggers, a mapping, of the plurality of different mapping options, between the uplink logical channel and the at least one uplink transport channel of the plurality of uplink transport channels of different uplink transport channel types; and
causing the uplink logical channel to be transmitted using the at least one uplink transport channel to which the uplink logical channel is mapped.

2. A method according to claim 1, wherein the first uplink transport channel comprises an uplink contention based channel and the second uplink transport channel comprises an uplink shared channel.

3. A method according to claim 1, wherein the determined mapping is valid for a first time period.

4. A method according to claim 1, wherein the control information comprises an indication to map the at least one uplink logical channel with at least one of the first uplink transport channel and the second uplink transport channel, wherein the indication is determined in dependence on which of at least one trigger is present.

5. A method according to claim 1, comprising providing a request to a network node to use the determined mapping.

6. A method according to claim 4, wherein the at least one trigger is dependent on at least one of: an uplink buffer load threshold, an uplink channel load threshold, an uplink logical channel latency threshold and a type of service requiring uplink access.

7. A method according to claim 6, comprising:
receiving, from a network node, an indication of at least one of the uplink buffer load threshold, the uplink channel load threshold, the uplink logical channel latency threshold and the type of service requiring uplink mapping.

8. A method according to claim 1, comprising: determining the mapping in dependence on whether the user device is operating in a discontinuous reception mode.

9. A method according to claim 1, wherein the user device is capable of operating using multi-connectivity for uplink transmissions, wherein the uplink transmissions are transmitted via one or more of a plurality of uplink transmission channels, comprising determining the mapping separately for each channel.

10. A method according to claim 1, wherein the mapping comprises mapping the at least one uplink logical channel with the first uplink transport channel and the second uplink transport channel and comprising:
causing the at least one uplink logical channel to be transmitted using the first uplink transport channel and the second uplink transport channel in parallel.

11. A method comprising:
determining, at a network node, control information being useable for mapping between an uplink logical channel and at least one uplink transport channel of a plurality of uplink transport channels of different uplink transport channel types, the plurality of uplink transport channels includes at least a first uplink transport channel of a first uplink transport channel type and a second uplink transport channel of a second uplink transport channel type different from the first uplink transport channel type, wherein there are a plurality of different mapping options between the uplink logical channel and the at least one uplink transport channel of the plurality of uplink transport channels of different uplink transport channel types, and each mapping option is associated with a respective trigger;
determining whether at least one trigger is present;
determining the mapping, of the plurality of different mapping options, in dependence on which of at least one trigger is present;
causing a transmission of the control information to a user device, wherein the control information includes an indication of the determined mapping.

12. A method according to claim 11, wherein the at least one trigger is dependent on at least one of: an uplink buffer load threshold, an uplink channel load threshold, an uplink logical channel latency threshold and a type of service requiring uplink access.

13. A method according to claim 11, comprising:
providing, to a user device, an indication of at least one of the uplink buffer load threshold, the uplink channel load threshold, the uplink logical channel latency threshold and the type of service requiring uplink access.

14. A non-transitory computer-readable storage medium comprising instructions stored thereon that, when executed by at least one processor, are configured to cause a computing system to perform the method of claim 1.

15. An apparatus comprising:
at least one processor and at least one memory including a computer program code, the at least one memory and the computer program code configured to, with the at least one processor, cause the apparatus at least to:
receive, at a user device, control information usable for determining whether an uplink logical channel is to be transmitted using at least one uplink transport channel of a plurality of uplink transport channels of different uplink transport channel types, the plurality of uplink transport channels includes at least a first uplink transport channel of a first uplink transport channel type and a second uplink transport channel of a second uplink transport channel type different from the first uplink transport channel type, wherein there are a plurality of different mapping options between the uplink logical channel and the at least one uplink transport channel of the plurality of uplink transport channels of different uplink transport channel types;
determine whether at least one trigger, of a plurality of triggers, is present;
determine, in dependence on said control information and on which of at least one trigger is present of the plurality of triggers, a mapping, of the plurality of different mapping options, between the uplink logical channel and the at least one uplink transport channel of the plurality of uplink transport channels of different uplink transport channel types; and
cause the uplink logical channel to be transmitted using the at least one uplink transport channel to which the uplink logical channel is mapped.

16. A non-transitory computer-readable storage medium comprising instructions stored thereon that, when executed by at least one processor, are configured to cause a computing system to perform the method of claim 11.

17. The method of claim 1, wherein each mapping option, of the plurality of different mapping options, is associated with a respective at least one trigger.

18. The apparatus of claim 15, wherein each mapping option, of the plurality of different mapping options, is associated with a respective at least one trigger.

19. The method according to claim 1, comprising:
receiving, by the user device, at least one threshold; and
determining, by the user device, at least one parameter;
wherein the determining a mapping comprises determining a mapping, of the plurality of mapping options, based on the at least one threshold and the at least one parameter.

20. The method according to claim 19:
wherein the at least one parameter comprises at least one of a Quality of Service (QoS) parameter, a buffer level or a buffer status or an amount of data to be transmitted by the user device, an uplink channel latency, an uplink channel load, an uplink channel resource utilization, an uplink channel modulation and coding scheme (MCS), or a number of collisions on a channel; and
wherein the at least one threshold comprises at least one of an uplink buffer load threshold, an uplink channel load threshold, or an uplink channel latency threshold.

21. The method according to claim 1, comprising:
wherein each mapping option, of the plurality of different mapping options, is associated with a respective at least one trigger;
the method comprising:
determining whether at least one trigger is present based on a threshold received by the user device and a parameter measured by the user device that are associated with each trigger of the at least one trigger; and
determining the mapping, of the plurality of different mapping options, in dependence on which trigger(s) of the at least one trigger is present.

22. The method of claim 21, wherein the received threshold associated with each trigger of the at least one trigger comprises at least one of the following:
an uplink buffer load threshold, an uplink channel load threshold, or, an uplink channel latency threshold.

23. The method of claim 21:
wherein the receiving control information comprises receiving the threshold associated with each trigger of the at least one trigger.

24. The method of claim 1:
wherein the first uplink transport channel comprises a non-contention based uplink transport channel, and the second uplink transport channel comprises a contention-based uplink transport channel;
wherein the determining a mapping comprises:
  determining a first mapping between the uplink logical channel and the contention-based uplink transport channel if a first trigger is present; and
  sending a request to a network for mapping the uplink logical channel to the non-contention based uplink transport channel if a second trigger is present, to allow the uplink logical channel to be transmitted over the non-contention based uplink transport channel.

25. The apparatus of claim 15:
wherein the first uplink transport channel comprises a non-contention based uplink transport channel, and the second uplink transport channel comprises a contention-based uplink transport channel;
wherein the computer program code and the at least one memory configured to cause the apparatus to determine a mapping comprises the at least one memory being configured to cause the apparatus to:
  determine a first mapping between the uplink logical channel and the contention-based uplink transport channel if a first trigger is present; and
  send a request to a network for mapping the uplink logical channel to the non-contention based uplink transport channel if a second trigger is present, to allow the uplink logical channel to be transmitted over the non-contention based uplink transport channel.

26. An apparatus comprising:
at least one processor and at least one memory including a computer program code, the at least one memory and the computer program code configured to, with the at least one processor, cause the apparatus at least to:
  receive, at a user device, control information usable for determining whether an uplink logical channel is to be transmitted using at least one uplink transport channel of a plurality of uplink transport channels that includes at least a non-contention based uplink transport channel and a contention-based uplink transport channel, wherein there are a plurality of different mapping options between the uplink logical channel and the at least one uplink transport channel of the plurality of uplink transport channels;
  determine whether at least one trigger, of a plurality of triggers, is present;
  determine, in dependence on said control information and on which of at least one trigger is present of the plurality of triggers, a mapping, of the plurality of different mapping options, between the uplink logical channel and the at least one uplink transport channel of the plurality of uplink transport channels, including being configured to cause the apparatus to:
    determine a first mapping between the uplink logical channel and the contention-based uplink transport channel if a first trigger is present; and
    send a request to a network for mapping the uplink logical channel to the non-contention based uplink transport channel if a second trigger is present, to allow the uplink logical channel to be transmitted over the non-contention based uplink transport channel; and
  cause the uplink logical channel to be transmitted using the at least one uplink transport channel to which the uplink logical channel is mapped.

* * * * *